United States Patent
Fairbairn

[15] 3,648,015
[45] Mar. 7, 1972

[54] RADIO FREQUENCY GENERATED ELECTRON BEAM TORCH

[72] Inventor: Thomas E. Fairbairn, The Belvedere Bldg., Galion, Ohio 44833

[22] Filed: July 20, 1970

[21] Appl. No.: 56,411

[52] U.S. Cl. .................................. 219/121 P, 219/121 EB
[51] Int. Cl. ........................................................ B23k 9/00
[58] Field of Search .......... 219/121, 121 EB, 121 EM, 121 L, 219/121 P; 313/231; 117/47

[56] References Cited

UNITED STATES PATENTS

| | | | |
|---|---|---|---|
| 3,347,698 | 10/1967 | Ingram | 117/47 |
| 3,492,074 | 1/1970 | Rendina | 313/231 X |
| 3,484,650 | 12/1969 | Rendina | 313/231 X |

OTHER PUBLICATIONS

" Radio– Electronics," Dec. 1952, pp. 42– 44. " Electronic Flame"
" Journal of Applied Physics," June 1951, Vol. 22, No. 6, pp. 835– 838. " The Electronic Torch"

*Primary Examiner*—J. V. Truhe
*Assistant Examiner*—Gale R. Peterson
*Attorney*—Cullen, Settle, Sloman & Cantor

[57] ABSTRACT

An electron beam torch whose flame is generated by high-power radio frequency provided by a modified radio frequency transmitter. The mechanical structure of the torch is comprised of an electrode held within a metal nozzle, which is attached by means of a metal tube to a high-voltage low-current point of the final output tank coil of a modified output circuit or amplifier. An amount of inert or other gaseous media is utilized to enclose the electron beam torch flame immediately adjacent to the torch nozzle orifice, to (1) provide a shield and focus the flame on the workpiece, (2) to cool the torch nozzle and prevent the electrode from melting and oxidizing and (3) to vary the temperature of the workpiece. Additionally, the gas shield may carry an amount of powdered ceramic or aggregate material to be introduced around the electron beam torch flame for flame spray coating of articles. The inert gas, or similar gaseous media together with the powdered ceramic or aggregate material are introduced into the final output tank coil of the modified high-frequency output circuit at a high-current low-voltage point to prevent ionization heating of the torch nozzle and carrier supply tubes.

4 Claims, 5 Drawing Figures

CONVENTIONAL OUTPUT TANK CIRCUIT.

INVENTOR.
THOMAS E. FAIRBAIRN.
BY
CULLEN, SETTLE, SLOMAN & CANTOR.
ATT'YS.

INVENTOR.
THOMAS E. FAIRBAIRN.
BY
CULLEN, SETTLE, SLOMAN & CANTOR.
ATT'YS.

RADIO FREQUENCY GENERATED ELECTRON BEAM TORCH

BACKGROUND OF THE INVENTION

The phenomenon of an electronic flame was first discovered by applicant sometime back in 1952 and was publicized in an article appearing in the publication "Radio Electronics," issue of Dec. 1952.

The basic theory of operation of the electronic flame is as follows:

The electronic flame was created with the use of a modified high powered radio frequency generator having a frequency preferably, but not limited to, in the range from 13 to 20 megahertz. In the modified generator the final, modified amplifier is connected to an output tank coil which is in parallel resonant circuit which, when tuned to resonance has a very high impedance and consequently high voltage across it. If the "Q" of the tuned resonant circuit is high, then there will be a point of a very high voltage and a very low current across the output tank coil at resonance. This voltage is very high and oscillating at 14 megahertz, there is no way to radiate this high power. A small 6-inch rod was placed at this point offering very little, if any, impedance to the resonant tank coil. Therefore, the "Q" of the circuit was not affected and the high voltage was moved to the end point of the rod. This high, potential energy had no place to go other than out at the end point of the rod into the atmosphere. This energy, as it rushed out at the small end point of the rod, caused the rod to get red hot and emit electrons into the atmosphere. It appeared that it was not the current which was making the rod hot enough to burn, but rather the high voltage constantly pounding away at 14 million times per second. This caused the rod to be burned off at the tip with a high intensity flame continuing to burn in the atmosphere as long as this high energy kept rushing through the rod.

A new unique method of applying the use of this basic electronic flame has now been discovered. It was discovered that the characteristic of the electronic flame could be used as a high intensity, high temperature torch or plasma sheat-electron beam flame with small modifications in the final amplifier circuit of the radio frequency generator.

The operation of the present radio frequency, electron beam torch (hereafter referred to as RFEBT) is startling, as the temperature of the basic electronic flame approaches the lower limits of a plasma in the atmosphere. Torch temperatures of 6,000 to over 35,000° F. are generated in the present device.

The energy is supplied to the RFEBT by a standard modified 2,000-watt radio frequency transmitter. When the RFEBT is operating, the transmitter is tuned to 13.6 megahertz ±6 percent, as assigned by the F.C.C. for scientific, medical and industrial use, and which is well within the preferred operating range of from 13 and 20 megahertz.

The present improved RFEBT demonstrates that a plasma-electron beam type flame torch can exist in the atmosphere where not before thought possible, when a low pressure inert gas or other gas like media and a source of high frequency energy is applied to a single rod-type electrode contained within a metal nozzle. The gas media confines, focuses, and directs the electron beam flame to the workpiece surface. One of the main functions of the gas is, to cool the nozzle and prevent the electrode from melting and oxidizing. The gas also contributes to the operation of the RFEBT by varying the temperature of the workpiece, and also can carry ceramic powder or other aggregates for direct ejection from the nozzle orifice.

Some of the many unique properties of the RFEBT are as follows:

1. The ability to boil ceramics, cements and metals whenever the flame is pointed, within a time of 1 to 10 seconds, or to drill a deep hole in some of the materials the size of the diameter of the electrode.

2. A quarter-inch electron flame beam diameter can be focused to a pinpoint, or fanned to a broad beam, by rotation of a garden hoselike torch nozzle, or by a change in the surrounding gas pressure. The distance of the workpiece from the output orifice, for best results, is about 1 inch.

3. The average electron beam diameter of the working part of the electron flame beam is about the same size as the diameter of the center electrode rod, whereas the focused center of the electron beam comprises about 25 percent of the diameter of the electrode rod.

4. The amount of shielding gas required to cool the electrode and at the same time heat various elements of the nozzle and the work area of the RFEBT, is (in some cases) less than one-tenth of a pound per square inch.

5. The provision of an electronic energy flame that is low in noise, air pollution and atmospheric oxygen.

6. The introduction of an inert gas into the torch without ionization heating of the supply hose or inert gas tank.

7. The introduction of metal or ceramic aggregates into the RFEBT for flame spraying, without ionization heating of the carrier supply hoses.

8. Minimum radio frequency interference since the RFEBT acts as a dummy load to the radio frequency generator.

9. The radiation output of the RFEBT flame has nearly the same electromagnetic spectrum as the sun. Its light output approaches that of an electric arc, even though the RFEBT flame is not an arc.

10. Extreme simplicity of construction of the torch nozzle, center rod electrode, supply gas and aggregate hoses, nozzle orifice, and other parts, facilitating teardown and reassembly of the complete nozzle system.

11. The provision of a flexible metal supply hose (preferably brass) connecting the nozzle to the resonant output tank coil of the radio frequency generator, where the output coil is part of the piping system for the carrier and feed gas. This metal supply hose conducts the radio frequency energy and inert gas to the electrode rod.

12. Standard 2,000 watts radio frequency generators can be used as the energy source for the RFEBT, this enables the operator to have control over the amplitude, frequency, pulse rate, pulse width, power level, temperature, audio noise, R.F.I., and light output of the electron beam torch.

13. The electrode rod material can be made of electrically conducting materials or aggregates, and the melting point of these materials sets the operating range for the RFEBT. (A small buildup of ceramic powders, like zirconium oxide, o the electrode rod, when operating the electron beam torch, contributes to higher temperatures, more stable operation and prolonged electrode life).

The single event that stands out as the most startling, during the operation of the present RFEBT is the fact, that the electrode rod is white hot when operating and emits a plasmalike electron beam flame over 6 inches long in the atmosphere, which can melt cement, yet the electrode is positioned inside a nozzle whose orifice remains cool.

SUMMARY OF THE INVENTION

The present RFEBT can be constructed from standard parts purchased from a supplier of copper or bronze fittings. The size of these fittings is relatively unimportant so long as they can be screwed together, and to the flexible supply hose carrying the electrical energy and that this energy is high enough to ionize the gas supplied to the RFEBT nozzle. As an exemplary embodiment, the metal fittings used for the nozzle assembly may have a diameter of one-half inch I.D. Three screws are tapped into the end fitting at 110° apart from each other, so that, with proper adjustment, the three screws will support and center the electrode rod properly within the nozzle assembly. Preferably, the electrode rod will be long enough to extend out of the orifice about one-eighth inch and back into the nozzle housing beyond the three screws, as far as the housing permits.

The electrode rod, in this example, is made of high carbon steel—but is not limited to this material—and may have a diameter of five-eighths of an inch. The three adjusting screws position the electrode rod with respect to the output orifice, so that there is an equal space all the way around the electrode. This space around the electrode rod, of approximately one-sixteenth inch, allows the inert gas, or other gas media, to be introduced and emerge from the nozzle orifice as a gas shield. The gas shield can be adjusted by rotation of the nozzle head or by changing the gas pressure. If the electrode rod is repositioned within the nozzle, this will also change the gas shield position about the flame, thus changing the focus and temperature of the RFEBT.

The high carbon steel electrode rod is connected both mechanically and electrically to the torch assembly and, therefore, electrically and thermionically they are the same with respect to electrical conduction and mechanical attachment.

Temperature measurement of the orifice of the RFEBT, when in operation, showed that the outside of the orifice remained relatively cool at 100 to 200° F., yet the flame was measured to have temperatures of from 6,000° to 35,000° F. The ability to maintain this large temperature difference is an important aspect of the confinement of a plasmalike electron beam flame; otherwise the nozzle, orifice, electrode rod and fittings of the torch would melt or burn up in the atmosphere.

Plasma confinement has been one of the many problems encountered in putting a hot plasmalike electron beam flame to practical use. Most arc plasma systems use cold water for cooling, but utilization of the expansion of inert gases, or other gas medias, to perform this function, is completely unique. The inert gas in the present RFEBT also performs other functions.

In the present RFEBT the shielding gas is prevented from reaching maximum ionization—until required after leaving the output orifice—by radio frequency isolation. This is accomplished by introducing the shielding gas into the high-current low-voltage point on the radio frequency final output resonant tank coil. The function of the RFEBT tank coil is to act as an ionization isolation network for the shielding gas and aggregate feed carrier gas. Without this isolation network, all gas feed hoses, fittings and supply tanks would heat up or melt as they emit light and arc the radio frequency energy to ground.

The output orifice of the RFEBT assembly is preferably connected by a flexible metal hose to the high-voltage low-current point on the output tank coil of the modified radio frequency generator. The reason for this configuration is, that the basic electronic flame is generated only at the high voltage point of the modified output tank coil circuit of a standard radio frequency generator. The shielding gas, having undergone isolation, is then free to perform its basic function in the RFEBT.

If a rod made of metal is placed on the output tank coil at the high voltage point, and it is shaped to a point, when the high radio frequency voltage appears at the base of the rod, the rod will burst into an oxygen flame in the atmosphere at the pointed end of the rod and emit electrons. The flame characteristic depends on the element that the rod is made of, in any event, the rod is a hot cathode, and the rod element is a fuel for the flame, as well as an electron emitter.

By the use of a torch orifice and gas nozzle as described above, it is possible to use the basic electronic flame phenomena as a source of very high temperature required to perform as a plasmalike electron beam torch. When the shielding gas, such as nitrogen, is applied, the flame can be focused by the shield of ionized gas ejected through the orifice of the nozzle. This gas shield contains the electron beam flame, for a short distance, on its way to the work surface, and, at the same time, reduces the atmospheric oxygen around the area of the hot electrode rod. The gas shield itself is a plasma which surrounds the ejected electron beam of about one-fourth of the rod diameter of the hot electrode rod in the nozzle. If the operator adjusts the flow of the shielding gas properly, he will reach a stable operating point, where the hot electrode will continue to emit an electron beam forming an ion sheath and the shield of gas containing the flame. The electron flow from the hot electrode rod will continue to conduct radio frequency energy, that first excited the electronic flame, into the plasmalike gas shield. The energy then continues to be located into the atmosphere or work surface, through the torch.

The RFEBT does not contain a high density current flow, but appears to be nearly neutral. Ceramic surfaces seem to melt quicker that metal surfaces placed at the same distance from the orifice of the nozzle, even though the ceramics have higher melting points than the metals tested. This is partly due to the conducting characteristic of most metals.

The basic parameters, given hereafter, to be considered in the operation of the present RFEBT are variable, but have an effect on each other so that a stable point of operation can be reached for any given configuration. These parameters are listed as follows:

1. Gas pressure.
2. Electrode or cathode position.
3. Orifice position with respect to the electrode or cathode.
4. Diameter of the electrode or cathode rod.
5. Shape of the electrode or cathode, (pointed or flat).
6. Type of material that the electrode or cathode rod is made of.
7. Type of inert gas.
8. Resonance point of output tank coil.
9. Capacitive or inductive reactance of the output impedance as reflected by the work surface or atmosphere.
10. Atmospheric pressure, in the region of the RFEBT.
11. Electrical values of the variables of the radio frequency generator.
12. Target (workpiece) surface position.
13. Type of target (workpiece), and configuration.
14. Humidity of the atmosphere and content.
15. Power input level to the RFEBT.
16. Frequency of the input energy to the RFEBT.
17. Tank circuit design quality "Q."
18. Size of the final output tank coil, number of turns, and position of shorting stub, for inductive tuning of the radio frequency generator.
19. Amount of aggregate and type introduced in the inert gas stream.

For any given operation, it will be necessary to conduct tests by variance of the above listed parameters, in order to obtain accurate data for proper design formulas. The operational parameters are known empirically, and the present design of the RFEBT and generator are constructed in this manner.

The empirical design criteria can be stated as follows:

1. Design the radio frequency generator for power inputs of 2,000 watts, or more, operating at the S.M.I. frequency (F.C.C. approved scientific, medical and industrial use).
2. Modify the output tank circuit for high circulating currents and very high Q'. Twice the number of turns normally required in the output tank coil gives a voltage step-up and also gives two high voltage points, so that two RFEBT nozzles can be installed, if desired. (The two nozzles can operate with their electron flame beams crossing each other, and this will give a higher temperature and flame beam width). The larger the tank coil diameter, and diameter of the copper tube that makes up the coil, the higher the Q'.
3. When constructing the final output tank coil, a good measure of successful design is to work for the highest radio frequency power output that can be obtained at the high voltage point.
4. Design the RFEBT nozzle out of standard copper or brass fittings, and construct them so that the electrode rod and nozzle is connected both electrically and mechanically to the output tank coil.
5. Measure the low voltage point on the tank coil and finding the point where the minimum radio frequency arc can be drawn. This is the high circulating current point of the tank coil and is the point where the inert gas, aggregate or powder and carrier gas fittings should be connected for coupling to a standard inert gas regulator and aggregate or powder supply.

The above design parameters are checked for proper adjustment, until the longest, brightest electron beam flame is shooting out of the RFEBT nozzle into the atmosphere. The shielding gas is adjusted last so that the nozzle, electrode rod, and torch assembly does not melt, yet the torch is not blown out.

The term "electron beam" is here used to describe the visible beam which seems to react like a coherent (single frequency sine wave) stream of electrons collimated or focused inside a chemically and electrically insulating ionized plasma sheath.

If ceramic powder or other aggregates are added to the shielding gas stream, this is preferably designed for variable powder feed.

When operating the present RFEBT, the operator will be required to wear welders goggles, although it is believed that the radiation output of the RFEBT is not as dangerous to the eye as the high current arc welder.

When operating the RFEBT, after all adjustments have been made, and the radio frequency generator is properly tuned, the controls and safety circuits, having been properly designed, can be handled by an operator with ease and little, if any, radio or electronics knowledge required, nor will the operator be required to have a F.C.C. license, since the system operates on the S.M.I. frequency set at the factory.

The RFEBT, when operating in the atmosphere, acts as a near perfect dummy load for the radio frequency generator.

For a better understanding of the operation and characteristic of the RFEBT, the present invention will now be described in detail by way of exemplary structural embodiments thereof as illustrated in the accompanying drawings.

DESCRIPTION OF THE PREFERRED EMBODIMENTS

Figure 3:
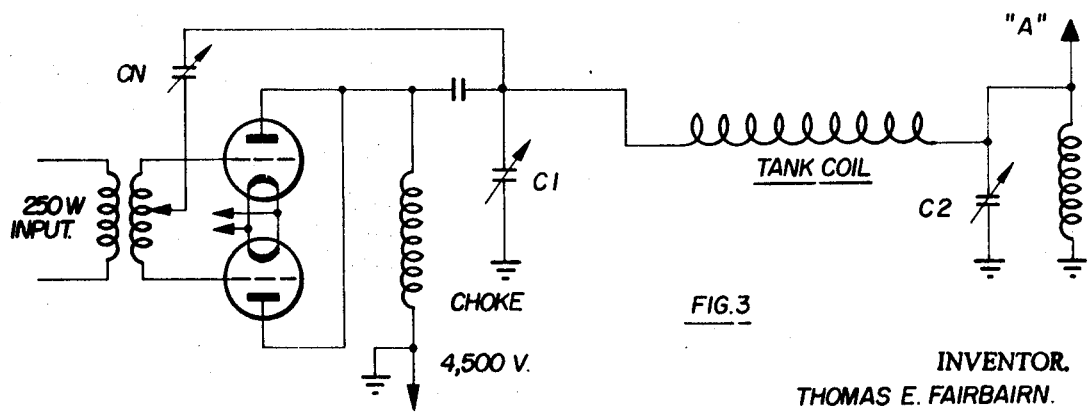
FIG. 3 is an electrical diagram of a conventional output tank or final amplifier circuit of a radio frequency generator.
Figure 4:
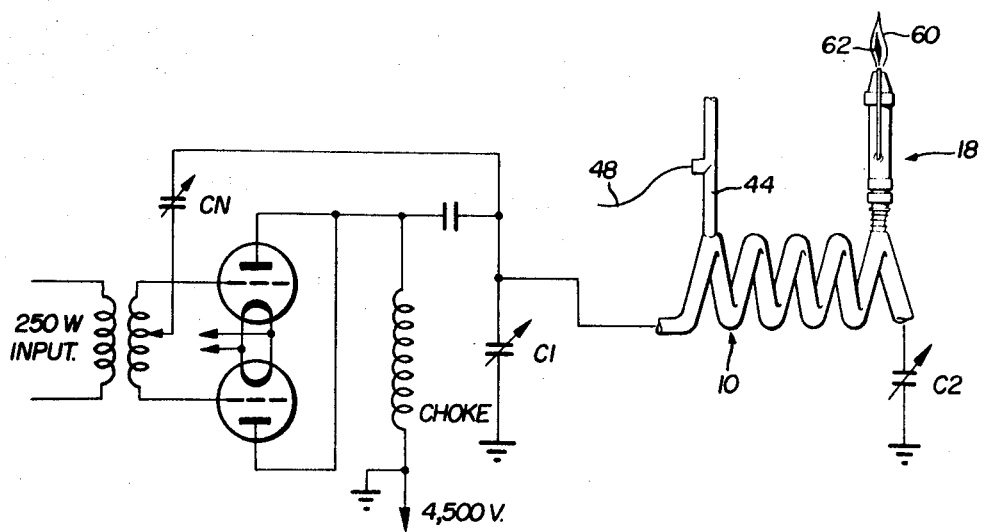
FIG. 4 illustrates the conventional output tank circuit of FIG. 3, being modified in accordance with the present invention.
Figure 5:
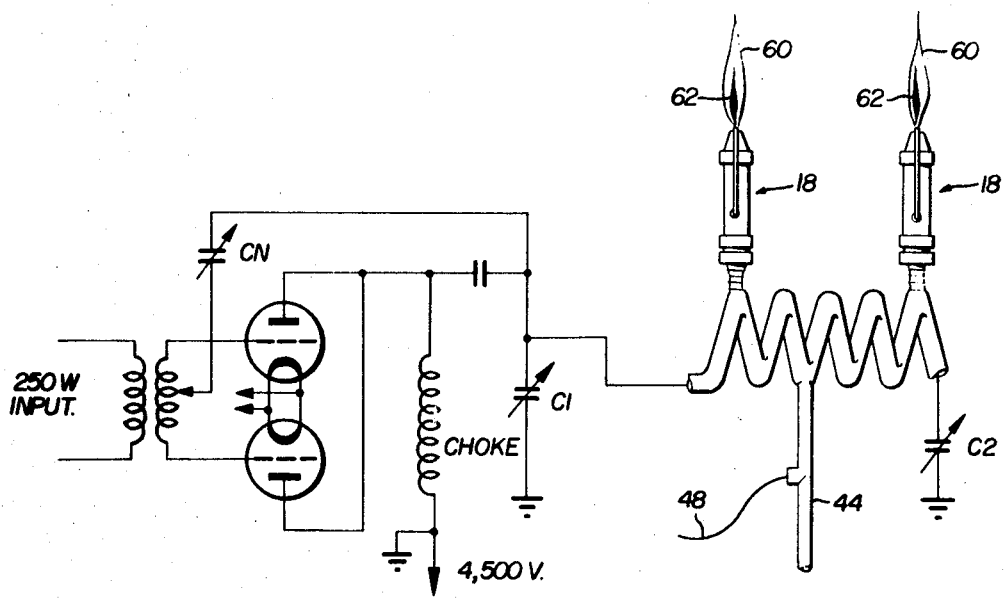
FIG. 5 is a further modification of the output tank circuit of FIG. 4, illustrating the use of two RFEBT nozzles connected on opposite ends of the output tank coil.

With reference to the electrical circuits illustrated in FIGS. 3 to 5, the present RFEBT uses a standard modified, parallel output circuit. A prime reason for choosing a parallel output circuit is that, once the power amplifier is excited by its 250-watt third amplifier, with the proper feed back $C_N$ variable neutralizing condenser, it is possible to allow the final amplifier to run free as a power feed back oscillator once it has been excited. This lends itself to a considerable reduction in equipment and also gives considerably less audio and electronic noise in the output electron beam flame because, the first subharmonic is not present and the sign wave output is of a pure fundamental frequency. It is not absolutely necessary that the third amplifier be disabled, but it seems to lend itself to less interference from a R.F.I. measurement and its use is mainly for starting the electron beam flame. It is also safer to the operator, in case he accidentally touches the nozzle, as the power will fall off resonance and removes the R.F. power.

It should be considered that the electronic flame, when the radio frequency generator is properly shielded and grounded, acts as a near perfect dummy load and radiation, unless it is through the power lines, is at a minimum. For very high powered generators, about 2,000 watts, a screen room might be recommended. The power output of the radio frequency generator herein described, is 2,000 watts or over, with 850 final mills plate current at 4,000 to 4,500 volts DC.

FIG. 3 shows a conventional standard output circuit of a Wilcox-type radio frequency generator (not shown). Any standard radio frequency generator which generates a pure sine wave and which has adjustable frequency would work for purposes of this invention. One such generator which has been successfully employed is transmitter Model 96C and rectifier unit Model 36A manufactured by Wilcox Electric Company of 1400 Chestnut Street, Kansas City, Missouri. FIG. 4 shows the output circuit after modification, omitting the antenna circuit "A." The modification, as illustrated in FIG. 4, is an important contribution to the generation of the electronic flame, i.e., the output tank coil 10 has been constructed to conduct very high circulating currents. The coils of the output tank coil are made from at least one-half inch wall thickness copper tubing. At 17 megahertz, the coil requires approximately six turns, each having a 4-inch diameter. The number of turns is very important in order that the maximum output power can be utilized and a shorting strap can be moved against two turns to inductively tune to resonance. The output tank variable condenser C1 is designed so as to short to ground the power that would normally go into the output circuit or flame for tuning purposes. The final load output tank capacitor C2 is important to the final tuning of the output tank. The very high "Q" tank circuit, using an output circuit including the electronic flame, has very little current carrying capacity through the atmosphere, to the work or to the ground, and thus can maintain this high "Q."

The final load tuning capacitor C2 and the output tank variable condenser C1, which are on the same rotor, are both designed to prevent high voltage breakdown and insulators (not shown) are placed nearly an inch from the ground, and are made of the best porcelain type. Airgaps should be large, at least a half-inch, and the equipment must be free of dust, powder, metal particles, etc., to prevent the formation of arcs. The output tank circuit is designed such that the variable capacitors C1 and C2 will be at a minimum when in resonance and operate on the following theory: Once a very high "Q" resonance circuit has been tuned fully, and wherein a variable output capacitor prevents the voltage from being applied to the electronic flame, but rather shunts it to the ground, the AC voltage through C1 is synonymous to a DC resistor acting as a load. Thus, capacitive loading is possible during tuning, and breakdown will not occur in the final tank circuit. If the circuits are designed rugged enough, it is not possible to damage its components by being out of resonance for short periods of time. Any standard radio frequency generator procedure is followed in order to tune the output tank properly. Once the output tank circuit is tuned, it has two very important characteristics: (1) very high tank circulating current and (2) very high voltage, at a high frequency. Resonant tank circuits, parallel in nature, have very high voltage points, that, theoretically, have very high circulating currents, which can reach infinity, depending upon the internal tank resistance, which is calculated by the formula which carries the letter designation "A." The flywheel effect of the parallel resonant tank circuit, with its highest circulating current, is the most important design criteria. Theoretically, the high current and high voltage points are 90 electrical degrees apart, i.e., at opposite ends of the standard tank coil. It is paramount to obtain a high voltage at the parallel points on the resonant output tank, although not high enough to emit rays, etc.

The output tank coil 10 is constructed so its turn ratio is twice what is normally required for a resonant tank circuit plus one turn, to aid inductive tuning by variable strapping, to have its high voltage point 90 electrical degrees away from its high current point. With the use of twice the amount of coil turns, an output tank coil is obtained that has two high voltage points of equal magnitude, with one high current point located in the center (see FIG. 5). This relationship is very important for the introduction of inert gas, carrier gas, liquids, powder, and powder feed carrier gas.

Figure 1:
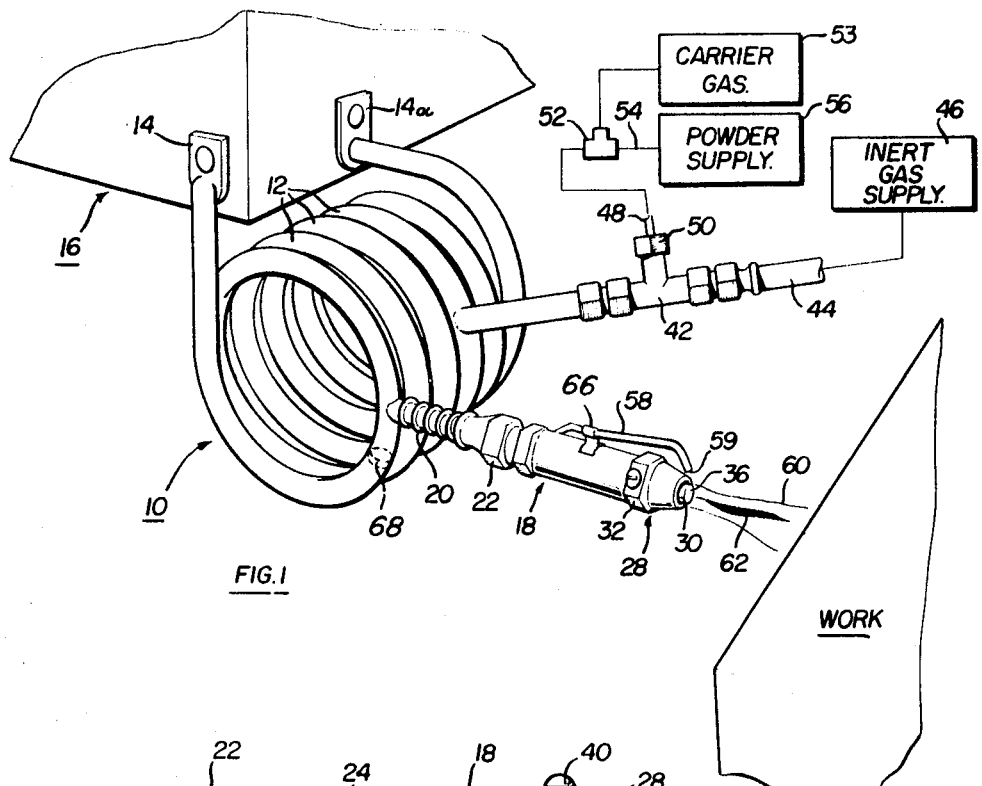
FIG. 1 illustrates in perspective an exemplary assembly of the present novel RFEBT.
Figure 2:
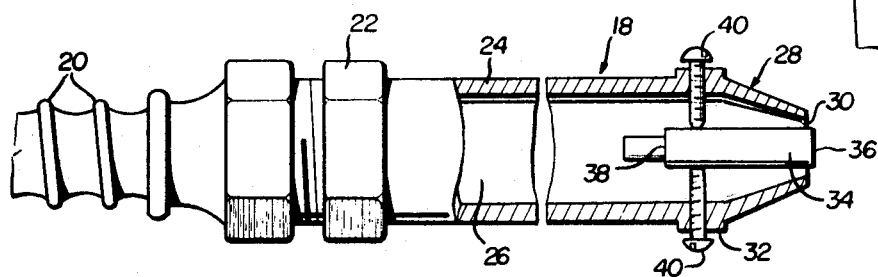
FIG. 2 is a longitudinal cross section through the nozzle assembly shown in FIG. 1.

Referring now to FIGS. 1, 2 and 3 in the drawings, which illustrate an exemplary construction of the final output tank coil 10, associated supply fittings and torch nozzle, the output tank coil 10, as mentioned before, is made from copper tubing having a plurality of turns of coils 12, which terminate in terminals 14 and 14a at opposite ends of the coil. Alternately, the flexible nozzle tube may be connected—like piping—to the open terminals 14 or 14a of the tank coil directly, while variably movable strap clamps (not shown) connect the coil assembly to the variable tank capacitor.

The terminals 14 and 14a are adapted for electrical connection to the final amplifier or output tank circuit 16 (shown in the diagram in FIG. 4) of a modified radio frequency generator of the Wilcox-type (not shown). Thus, if electrical power is supplied to the modified output tank circuit 16, high current flow and voltage will be applied to the output tank coil 10, creating at least one high-voltage low-current point near one or both ends of the tank coil 10 and a high-current low-voltage point in the center of the tank coil.

As seen in FIG. 1, a nozzle 18 is attached by means of a flexible metal conduit 20 directly by pipe fittings or the like to the output tank coil 10 at the high-voltage low-current point for communication with the interior of the copper tube tank coil 10.

With particular reference to FIG. 2, the nozzle 18 is attached to the end of the flexible tube 20 by means of a fitting 22 and comprises primarily a cylindrical body 24 having a longitudinal chamber 26. Attached to the outer end of the cylindrical body 24 is a jet nozzle 28 provided with an orifice 30. The jet nozzle 28 is attached to the cylindrical body 24 by means of a nut 32.

Positioned centrally within the chamber 26 is an electrode rod 34, which, in this instance, is preferably of about five-eighths of an inch in diameter and can be 5 to 10 inches in length. The electrode rod 34 is preferably machined flat at the outer end 36 and having a flat surface 38 at the inner end. Electrode rods machined to a point at the outer end 36 are self-igniting in the atmosphere when current is turned on, however, flat tips are preferred for larger electron beam diameter. The electrode rod 34 is being held in axially centered position within the chamber 26 of the nozzle assembly 18 by means of three adjusting screws 40 spaced 120° apart, which extend through the nut 32 inwardly of the chamber 26 into abutment with the electrode rod 34. Upon proper adjustment of the screws 40, the electrode rod 34 can be correctly centered relative to the chamber 26 and the nozzle orifice 30 and will be tightly held within the chamber 26 by means of the screws 40. The flat rod tip 36 extends a small distance—about one-fourth to one-half inch—through the nozzle orifice 30 and the nozzle orifice 30 is of such a diameter relative to the diameter of the electrode rod that, when the electrode rod is axially centered in position, a radial space is provided at the orifice around the electrode rod.

The electrode rod 34 may be of any type of material, even glass or certain ceramics. In most cases, however, carbon steel is preferred which may be coated with a plasma-sprayed carbide or thoiated tungsten coating. After ignition, the carbon steel electrode rod becomes the basic sustainer fuel and electron emitter for the electronic flame.

Referring again to FIG. 1, an inlet fitting 42 is attached and screwed into the tank coil 10 for communication with the inside of the tank coil at the high-current low-voltage point of the tank coil 10. The inlet fitting 42 is securely attached to a tube 44 leading to a supply of gas 46, such as nitrogen, or the like. The tube 44, for the gas supply, is preferably made of rubber. The reason for introducing the gas at the high-current low-voltage point of the tank coil 10, is to prevent electric power from being shorted to the ground through ionization of the gas causing melting of the tubes and fittings introducing the gas into the tank coil 10. Thus, the gas, when introduced through the fitting into the tank coil 10, moves inside and around the tank coil 10 and into and through the flexible tube 20 of the nozzle assembly 18 and from there into the chamber 26 and along the electrode rod 34 to exit through the orifice 30 around the tip 36 of the electrode rod. The gas, when introduced into the nozzle assembly via the tank coil, serves important purposes, in that the gas keeps the nozzle assembly and the central electrode rod cool to prevent melting and also keeps control over the melting point of the electrode rod. Thus, by proper adjustment of the amount of gas introduced and surrounding the electrode rod, the proper point can be reached at which the electrode rod and the nozzle orifice are not consumed by the electronic flame. Another important function of the gas introduced into the tank coil 10 for exit through the orifice 30 of the nozzle assembly is to shield the electronic flame against oxygen active in the atmosphere, to thereby direct and focus the flame. Without the use of the gas shield, the electronic flame, when introduced into pure oxygen atmosphere, has a tendency to turn upward perpendicular from the earth surface. The amount of nitrogen gas introduced in this particular exemplary embodiment is normally less than a tenth of a pound per square inch but is, however, not restricted to this value.

The gas may be an inert gas such as nitrogen, helium, argon, krypton or the like or may comprise any other suitable gaseous media such as pure oxygen, propane, hydrogen or even water steam.

With further reference to FIG. 1, the present invention contemplates, in addition to the introduction of the gas into the tank coil 10, the introduction of a powder material or other aggregate into the tank coil 10, which is fed into the tank coil 10 through the gas inlet fitting 42 by means of a flexible rubber or plastic tube 48 connected by a fitting 50 to the gas inlet fitting 42 and at the other end to a fitting 52 which is suitably connected by means of a tube 54 to a powder or aggregate supply tank 56. Conversely, the powder supply tube 48 may be directly connected to the tank coil 10 immediately adjacent the inlet of the gas tube fitting 42. The rubber or plastic tube 48 of the powder or aggregate supply is continued through the fitting 42 for extension into the tank coil 10 and around the inside of the tank coil, through the flexible tube 20 of the nozzle assembly where the plastic or rubber tube ends for connection to an outside copper feed tube 58, which is suitably attached to the tubular body 24 of the nozzle assembly 18 by means of a clamp 66. The open end 59 of the copper tube 58 is positioned directly adjacent the nozzle orifice 30 such that the powder or other aggregate will be introduced into the gas shield immediately adjacent the nozzle orifice 30. Thus, by the introduction of the powder or aggregate, the RFEBT can be used as a high temperature plasma spray gun. An appropriate carrier gas from a supply source 53 is simultaneously introduced into the tank coil 10 through the tube 48, adapted to be the carrier for the powder or other aggregate to move through the tank coils 12. Powder aggregates can also be introduced via a powder feed unit, introducing the powder along with the shielding gas.

With reference to FIG. 5, the output tank coil 10 is constructed such as to accommodate a pair of electronic flame nozzles 18 disposed at opposite ends of the tank coil at the opposite high-voltage low-current points thereof. By this construction, the activity of the electronic flame action will be considerably increased by a factor of over four for uses with higher temperatures for welding, melting, cutting, etc. When the dual electronic flames are arranged so that the flame beams cross each other, there is no increased current flow activity, unless the voltage points at the tank coil connections are different. In the construction in FIG. 5 the two electronic flame nozzles may emit different powder aggregates for mixed work requirements.

It is feasible that more than two electronic flame nozzles can be operated off of one tank coil by increasing the length of the tank coil. As mentioned before, with the advance in technology in powder metallurgy, the present RFEBT can by used as a plasma spray gun by the introduction of powdered metals, ceramics, aggregates and/or liquids into the electronic flame. The powder or aggregate and carrier gas, as described above, will be introduced into the tank coil 10 at the same point, or adjacent where the inert gas is introduced, that is, at the high-current low-voltage point of the tank coil. Also, the powder and carrier gas is routed through the tank coil to emerge into the atmosphere before being introduced into the electronic flame. This provides complete radio frequency isolation by means of the rubber or plastic powder and gas carrier feed tube extending into and around the coils of tank coil 10 and by introduction at the low-voltage point of the tank coil, ionization heating of the fittings and feed tube is prevented.

As shown in the drawings, the powder feed introduction into the electronic flame is preferably located outside of the nozzle in the case of ceramic or metal powders so that a higher spray pressure can be used. Aggregate feed can also be directly through the center rod or radially around the rod at lower pressure. In the case that an oxygen gas is being used as the carrier gas for the powder or aggregate, it will be necessary to plasma spray the powder feed orifice with a high-insulation-type ceramic, zirconium oxide or the like, to prevent the electronic flame from burning the powder feed orifice, due to the oxygen, unless oxygen is sprayed externally.

With reference to FIG. 1, the tank coil adjacent to the outlet of the flexible metal tube 20 is provided internally with a deflector disc 68 to cause the inert powder carrier gas, introduced through the coils, to flow out through the metal tube 20 instead of causing a powder jam inside the coils. Preferably, one deflector disc 68 is located inside at one end of the tank coil 10, if no inside plastic powder carrier tube is used, and only one torch nozzle is used. If two torch nozzles are used at opposite ends, no deflector discs are required.

IN OPERATION

The RFEBT operator fires up the various stages of the power supply and generator, stage by stage, checking the preset meters for proper readings. The operator then switches on the final switch to ignite the electrode rod after turning on the nitrogen plasma gas supply. If the RFEBT does not self-ignite, the operator may ignite it with a shorting rod. As the operator looks directly at the electrode rod to see if it is melting, he can increase the inert gas pressure slightly. The proper setting is obtained when the center electrode rod is white hot, but not melting. With welders goggles on, the electrode rod will look cherry red. The work surface is set about 1 inch away from the output orifice of the nozzle, but this may vary for different applications. Immediately after turning on the adjusted RFEBT, the tip 36 of the electrode rod will ignite and burst into a flame 60 emitting electrons which form the electronic center beam 62. If higher temperatures are required, the electrode rod can be exchanged with a higher melting point element. In the case of certain ceramics, bricks, cements, stones, etc., after they have been melted, when they are cooled the melted area will turn to glass or, in the case of metals, to oxides.

The gas is allowed to flow after the energy is switched off as this will cool the electrode rod and prevent oxidation.

The cost of an electrode rod made of high carbon steel is no more than the cost of a high carbon steel drill and if the rod needs to be replaced, this can be done quickly by unscrewing one support screw and allowing the rod to drop out. The electrode rod can be made of various aggregates or elements as mentioned before and may be solid or have a center hole drilled through it. Electrode rods that have their centers drilled out are used in plasma flame spraying of metals, ceramics, and aggregates. These powders or aggregates are carried by a carrier gas, such as nitrogen, to the nozzle. There are three methods for introducing the powders to the electronic flame. The first method is directly through the hole in the center of the electrode rod, the second method is radially between rod and nozzle and the third method is outside of the torch by a separate tube injection into the hottest part of the electronic flame. In the first and third method, the powder feed tube is made of plastic or nonconductive material and must be returned through the nozzle, gas tube and tank coil and out at the high current point for radio frequency isolation.

The exception is that the plastic tube is fitted into a copper tube when it exits from the nozzle for external powder feed into the flame, or is disposed inside the nozzle for higher temperature applications which might melt the plastic. In the radial method, it is piped directly through the tank coil and out the nozzle as part of the plasma gas.

Due to the low pressure of the inert gas feed to the RFEBT, there is no blowing away of the molten surface of the work area. This fact makes it possible to grow synthetic gems, by using the internal powder feed for seeding the plasma, for crystallization of the work target area and for increasing the temperature application.

If cutting of the work is desired, it may be accomplished by increasing the pressure of the gas feed to the electrode rod, this will blow away the melted material and leave a cutaway area. The cutting gas should be used intermittently so as not to put out the flame in the torch, however, after the torch has operated on a workpiece for several minutes, the inert gas feed can be increased to over 40 p.s.i. without blowing out the torch.

The most important feature of the RFEBT is its ability to work on ceramics. Ceramic materials are electrically nonconducting elements. The RFEBT lends itself better to working with ceramics, cements, cerments, etc., than metals, the reason being that it is thought because the metal work surfaces have a higher free electron supply than ceramics, etc., the current carrying metals may load the radio frequency generator to a higher degree via the center electron beam, perhaps even making the circuit reflect an inductive reactance back to the output tank coil and cutting down on the "Q" factor.

The ceramic, etc., workpiece and the atmosphere seem to reflect a capacitive reactance back to the output tank coil. If this is true, the reflective capacitive reactance increases the "Q" of the output tank coil and thereby increases the torch temperature. The opposite would be true in the case of a metal workpiece, the reflective inductive reactance would lower the "Q" of the output tank coil and, therefore, cut down the temperature of the torch. In either case, the temperature difference at the work surface is not large.

Some of the important applications which the RFEBT can be used for are: drilling holes through cement; very high temperature heating of ceramic ladles filled with lower melting point metals and ceramics; ceramic welding to other ceramics and metals; plasma flame spraying; synthetic gem manufacturing; and providing a near pollution free torch for high temperature heating. Further uses could be made of the RFEBT in the chemical field for chemical testing, making new chemical combinations, form new chemicals or aggregate products, and as a spectroscopic light source. Other uses are as a high intensity light source, and a space ship plasma jet thruster.

Theoretically, the RFEBT can be utilized for the many functions presently performed by electronic vacuum tubes, such as picture tubes in TV, since the electron beam of the present RFEBT can be scanned and due to the gas shield which forms a near vacuum in the atmosphere to confine and focus the electron beam emitted from the tip of the electrode.

SUMMARY

The RFEBT, using the basic electronic flame as described, is a phenomena in that, when a high frequency output tank coil with very high circulating currents and extremely high voltage is connected to a rod, the rod being round and flat at both ends (or if the other end is machined to a point), a flame will ignite from the end of the rod by emitting electrons, mixing the basic element of the rod with the oxygen of the atmosphere to form an oxidation flame of the fuel that is part of the element of the rod. When inert gas is introduced into the low current point of the final output tank coil and is ejected through the specially designed nozzle orifice, the nozzle will emit a plasma-in-nature discharge, wherein the basic electronic flame temperatures of several thousand degrees are being raised to upward of those temperatures which are experienced in basic plasmas, i.e., 60,000,000°.

This electronic flame or electron beam, at these high temperatures, when shielded from the atmosphere by an inert gas, can then be used to advantage for cutting, melting, welding or boring metals or ceramics or, by the introduction of a powder material or aggregate into the electronic flame, the RFEBT can be effectively used as a high temperature plasma spray gun, particularly for ceramics.

The theory on which the operation of the electronic flame torch is based is as follows:

Once the hot electrode rod is ignited, it emits a heavy stream of electrons for one-half of cycle of the 13.65 megahertz power delivered to the end point of the electrode rod.

During the electron emission during one-half cycle, the nitrogen carrier gas emitted from the orifice is ionized and the ions form an ion sheath around the center electron beam during the next one-half cycle. During subsequent half-cycles, the center electron beam, when aimed at the target (which in this example is a ceramic or other nonconductor) will form a high density negative charge area on the surface of the ceramic-type target. In the next half-cycle or odd train of half-cycles, the ions of nitrogen which are a positive charge, will be recombined with the negative electrons deposited on the work surface area (ceramic surface). This causes high temperature to be created in the ceramic surface. The positive nitrogen ions (or any other inert ions) being very much larger in size and weight do not follow the radio MF frequencies rapid rise and fall as the electrons do, so that more electrons are free than ions, and also the electrons cause some secondary emission so that the electron beam density is quite large and can create very high temperatures.

If a ceramic or other powder is introduced into this beam, the nitrogen or other inert gas will carry the powder ceramic to the work area, and when the positive ion of the nitrogen carrying the ceramic powder reaches the target ceramic surface it will recombine as a nitrogen ion during the odd half-cycle. The ceramic powder will be deposited on the target area surface in place of the negative electrons. This process will continue each off or even half-cycle. Remember that the inert nitrogen gas also cools the electrode rod and the end point of the electron beam at the target, because more inert positive ion nitrogen atoms are recombining, cutting down on the high electron density of the center electron beam. The high energy emission at the end point of the rod causes the rod to act as a cathode, which emits an electron beam. This electron beam causes a center part of the rod to become a cathode or intense negative spot or beam area about one-quarter of the center area of the hot cathode rod. The balance of the cathode rod becomes nearly white hot and ionizes the cool nitrogen or other inert gas and forms a nitrogen sheath. The cathode rod gets hotter by primary and secondary emission, but the cool nitrogen gas cools the cathode area and prevents the balance of the electrons from destroying the cathode rod.

When a ceramic powder, such as zirconium oxide (melting point 6,500° F.), is sprayed through the nozzle, radially between the rod and the orifice, it is melted rapidly and deposited, for instance, on cement, in a 30-second period. Zirconium oxides sprayed as part of the plasma-gas is carried at only one-tenth pound per square inch gas pressure. The nozzle is aimed at 1 inch from the work area. The ceramic powder zirconium oxide is completely melted while being sprayed, if the zirconium spray is aimed at one spot, the spray output in the radio frequency, electronic beam plasma torch will build a cone rapidly toward the orifice. The zirconium oxide seems to intensify the torch temperature, because of the zirconium oxide coats the rod, but the rod emits the electron beam anyway.

The zirconium oxide is white hot at both the work areas and the cathode rod. The zirconium oxide coating or the rod follows the theory that, whatever material the rod is made of, its melting point sets the temperature standing level.

What is claimed is:

1. A method for generating a high temperature radio frequency plasma beam comprising:
   generating a single frequency coherent sine wave signal in a hollow electrically conductive tubular tank coil of a radio frequency generator;
   injecting a gas into a maximum current zero voltage point of said tank coil;
   conveying said gas through said coil to an exit port located at a maximum voltage zero current point of said coil;
   conveying said gas from said exit port through a hollow electrically conductive outlet tube to an outlet nozzle;
   and transmitting said single frequency coherent sine wave signal from said maximum voltage zero current point of said coil to an electrode centrally located in said nozzle orifice, while maintaining said electrode and said surrounding nozzle at the same electrical potential, and while maintaining said electrode and any workpiece against which the plasma beam may be directed electrically insulated from ground;
   whereby said gas forms an annular sheath which surrounds and focuses into a beam the high temperature plasma stream emitted from said electrode and nozzle orifice.

2. The method of claim 1 which further comprises:
   injecting a finely divided heat fusible material into a maximum current zero voltage point of said tank coil;
   and conveying said material through said tank coil and out through said exit port to said nozzle orifice;
   whereby said material enters the beam emitted from said nozzle, said material being thus sprayable onto workpieces to be deposited and fused thereon as a coating.

3. A radio frequency plasma torch for generating a high temperature plasma beam comprising:
   radio frequency generator means including a tank coil formed of hollow electrically conductive tubing electrically and mechanically connected at both ends to the generator and adapted to generate a single frequency coherent sine wave signal;
   a hollow electrically conductive outlet tube connected at one end to an outlet port of said tank coil located at a maximum voltage zero current point of said tank coil, the interiors of said tank coil and said outlet tube being in communication with each other at said outlet port to establish a flow path from said tank coil to said outlet tube for materials injected into said tank coil;
   an electrically conductive nozzle at the other end of said outlet tube;
   an electrode centrally mounted in the outlet orifice of said nozzle and electrically connected to said nozzle so as to remain at the same electrical potential as said nozzle, said electrode being electrically connected to said tank coil at said exit port;
   a gas supply system including a source of pressurized gas and conduits connecting said gas source to the interior of said tank coil at a maximum current zero voltage point of said tank coil;
   said electrode and any workpiece against which the plasma beam emitted from said nozzle may be directed being electrically insulated from ground;
   whereby when said signal is applied to said electrode and said gas is injected into said tank coil and conducted therethrough and through said outlet tube and exhausted through the annular gap between said electrode and said nozzle, a high temperature plasma beam will be emitted from said electrode, said beam including an annular sheath of gas which surrounds and focuses said beam.

4. The torch of claim 3, which further includes a material supply system for conveying a finely divided heat fusible material into a maximum current zero-voltage point of said tank coil, said tank coil establishing a flow path for said material to said exit port, and said supply system further including conduit means for conveying said material from said exit port to said nozzle orifice, whereby said material is caused to enter and flow with said plasma beam to be sprayed and deposited and fused as a coating on a workpiece.

* * * * *